July 24, 1956 R. D. ACTON 2,755,625
HYDRAULIC STEERING MECHANISM FOR TRACTORS
Filed Jan. 19, 1953 2 Sheets-Sheet 1

INVENTOR.
Russel D. Acton
Paul O. Pippel
Atty.

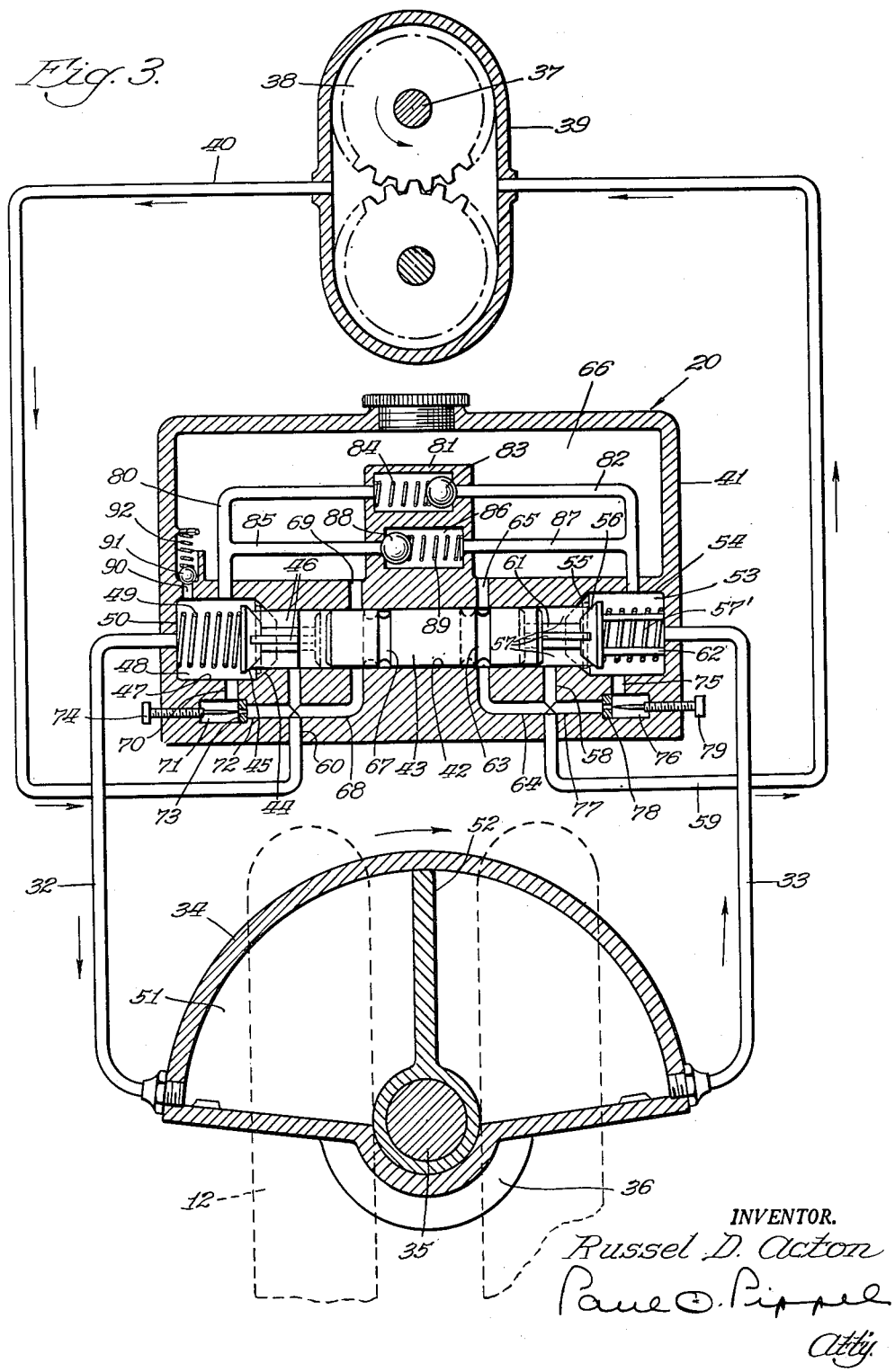

United States Patent Office 2,755,625
Patented July 24, 1956

2,755,625

HYDRAULIC STEERING MECHANISM FOR TRACTORS

Russel D. Acton, Chicago, Ill.

Application January 19, 1953, Serial No. 332,029

5 Claims. (Cl. 60—52)

This invention relates to a hydraulic steering mechanism for tractors. More specifically, it relates to a steering device including a hydraulic motor for operating dirigible wheels and a remotely located manually operated hydraulic pump.

In the steering of farm tractors mechanical devices have been ordinarily used to transmit movement from a steering wheel to one or more dirigible wheels at the front of the tractor, several problems have been encountered due particularly to different types of work for some of which it is desirable to have a rigid or non-yielding mechanism termed in the art as irreversible so that the tractor maintains its course without shock to the operator when obstructions are encountered. Under other conditions, it is desirable to have a non-rigid or yieldable known as reversible steering to permit the steering wheels of a tractor to follow furrows or ridges. There are other disadvantages to mechanical steering particularly the mechanical linkage required from the operator's station to the dirigible wheels.

A principal object of the present invention is to provide an improved hydraulic mechanism for vehicles, particularly farm tractors.

Another important object is to provide manual operating means for a hydraulic steering mechanism which can be readily adjusted for different operator positions or for different operators.

Another important object is to provide in a steering mechanism, means to vary the degree of yieldability or reversibility of the mechanism.

Another specific object is to provide for automatically maintaining liquid in a hydraulic steering system at the proper pressure and in proper amounts.

Another specific object is to provide relief means in a hydraulic steering system to prevent breakage to the steering mechanism by automatically releasing the steerable wheels upon the application of a predetermined excessive force thereagainst.

Another specific object is to provide means in a hydraulic steering system to relieve excess pressure due to fluid expansion by heating.

The above objects and others which will be apparent from the detailed description to follow are accomplished by a construction such as illustrated in the drawings, in which:

Figure 3 is a diagrammatic view of the entire hydraulic mechanism making up applicant's invention.

Figure 1:
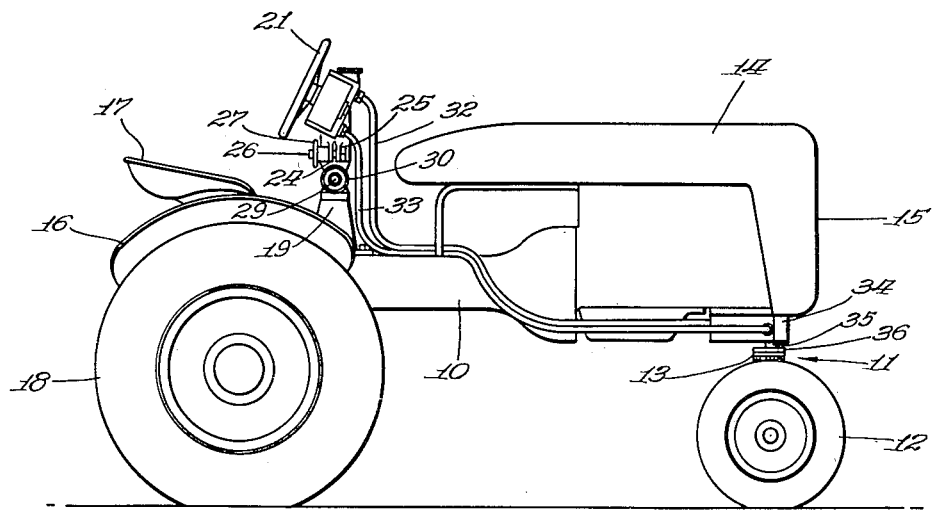
Figure 1 is a side elevation of an agricultural tractor showing an embodiment of applicant's hydraulic steering mechanism.

Figure 1 illustrates in outline a conventional farm tractor having a narrow body 10, a front steering truck designated in its entirety by the reference character 11, and said truck having wheels 12 and a steerable center post 13.

Figure 1 also shows diagrammatically a fuel tank and hood structure 14, a radiator structure 15, fenders 16, an operator's station or seat 17, and traction wheels 18.

Figure 2:
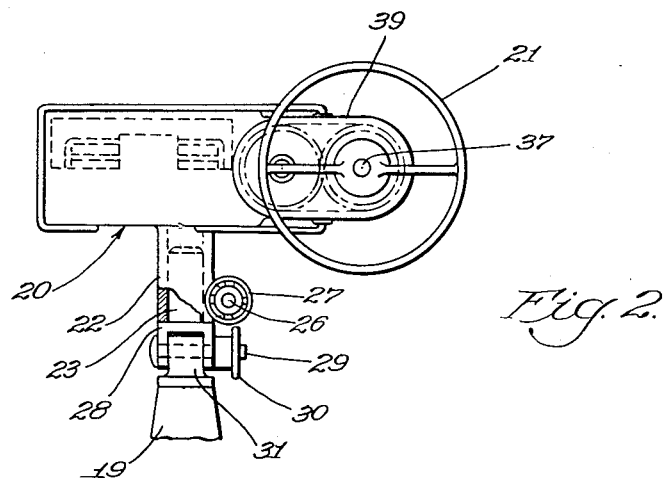
Figure 2 is an enlarged rear elevation of the steering wheel and other significant parts of the supporting structure for the hydraulic steering mechanism shown in Figure 1.

As shown in Figures 1 and 2, a supporting post 19 mounted on the body 10 of the tractor ahead of the operator's station 17 provides means for pivotally supporting a casing structure designated in its entirety by the reference character 20 which houses the hydraulic valve mechanism of the device and carries a steering wheel 21. The casing structure 20 includes an integral sleeve 22 extending downwardly and adapted to slidably fit over a stub-shaft 23. The sleeve 22 is provided with a slot 24 at one side extending in an axial direction. Spaced ears 25 at opposite sides of said slot provide means for clamping said ears together by means of a pin 26 and a hand wheel 27 threaded thereon. By this means the casing structure 20 may be adjusted vertically to alter the height of the steering wheel 21 and may be rotated about a vertical axis to vary the angular position of the steering wheel 21.

A U-shaped member 28 secured to the stub shaft 23 is apertured to receive a clamping bolt 29 on which a hand wheel 30 is threaded. By this means the U-shaped member may be adjustably clamped to a vertically extending support 31 carried rigidly by the supporting post 19. By means of this clamp arrangement, the steering 21 may be tilted about a transverse axis to change its angular position to suit the requirements of the operator. This is a particularly desirable adjustment if an operator desires to stand a part or all of the time. Two hoses 32 and 33 connected to the casing structure 20 extend along the tractor body in any suitable location to the forward end thereof where they are connected to a casing 34 which contains a hydraulic motor for steering the front wheel structure of the tractor. As illustrated in Fig. 2, a shaft 35 extending from the casing 34 is provided with a flange 36 which is secured to the flange 13 previously referred to. The remaining elements which are not visible in Figures 1 and 2 are shown diagramatically in Figure 3 which illustrates the complete valve structure for the hydraulic steering system.

The steering wheel 21 is mounted on a shaft 37 which is illustrated in Figure 3 as carrying one gear 38 of a gear pump mounted in a pump housing 39 which, as shown in Figure 2, is a part of the casing structure 20. The pump illustrated is of the gear type being reversible, that is, adapted to operate in either direction drawing in fluid from either side and discharging it to the other side. In the step of operation illustrated in Figure 3, the steering wheel and the shaft 37 are rotated in an anti-clockwise direction as indicated by the arrow. Fluid is therefore being discharged through a conduit 40 which connects with the pump housing.

A casing structure 41, as illustrated diagrammatically and in section in Figure 3, includes a bore 42 in which a piston valve 43 is mounted for reciprocation. At the left-hand side of the drawing, the bore 42, is formed with a tapered valve seat 44 on which a valve 46 is adapted to seat, said valve is guided in the bore 42 by spaced wings or guides 46 which maintain the valve in concentric position while permitting liquid to pass while the valve is in open position as illustrated.

The valve seat 44 joins a larger bore 47 which provides a chamber 48 for a compression spring 49 abutting the end wall 50 of the chamber at one end and the valve 45 at the other end. The conduit 32 referred to in the description of Figure 1 connects the chamber 48 with the motor casing 34. Said casing is formed internally with a substantially semi-cylindrical chamber 51 of a well known form to provide for oscillation of a vane-type piston 52 which is rigidly carried by the shaft or post 35 for oscillation therewith. It will be noted that the wheels 12 of the tractor have been indicated in dotted lines in Figure 3 to better illustrate the operation of the device and its location with respect to the actual parts of the tractor.

The conduit 33 connects the chamber 51 at the opposite side of the vane with a chamber 53 which is formed by a bore 54 in the casing structure 20. Although most of the parts at the right-hand end of the casing structure, as shown in Figure 3, are symmetrical with respect to those on the left-hand side, separate reference characters will be used in order to better describe the action of the valves during operation of the device.

The bore 54 connects with the valve seat 55 which joins the bore 42. The valve 56 adapted to cooperate with the seat 55 is guided by wings or guides 57 adapted to slide within the end of the bore 42. A compression spring 57' abutting an end wall of the chamber 53 and the valve 56 acts to urge said valve into seated position unless removed therefrom by forces greater than the spring.

A conduit 58 connects with the bore 42 at one end and with a conduit 59 leading to the pump housing 39. The conduit 40 which communicates with the other side of the pump casing connects with a bore 60 which joins a left-hand end of bore 42.

As the operation of this device will be described in connection with the application of the reference numerals to the parts, it can be explained at this point that when the steering wheel is moved to rotate the pump gear 38 in an anti-clockwise direction, fluid forced to the conduit 40 and the bore 60 acts to open the valve 45 against the pressure of the spring 49, whereby fluid under pressure is delivered through the conduit 32 to the chamber 51 at the left-hand side of the vane chamber 51 and against that side of the vane 52. The wheels are therefore angled in the same direction indicated by movement of the vane 52 and in an amount determined by movement of the steering wheel 21 and the gear 38. The ratio of the fluid pump and the fluid motor, that is, the number of degrees of movement of a steering wheel necessary to move the wheels one degree is determined by the amount of force required to steer the tractor with a satisfactory effort on the part of the operator. As hydraulic equipment of this type is very efficient, there is comparatively little loss of power and an operator can effectively deliver most of the effort exerted to the steerable wheels. It is only necessary to change to a pump of different capacity to alter the ratio between the steering wheel and the steerable wheels of the tractor.

When pressure is exerted in the bore 42 to open the valve 45, the piston valve 43 is forced to the right to the position shown in Figure 3. It will be noted that the end of said valve abuts a stem 61 carried by the valve 56, whereby said valve is moved to open position by movement of the piston valve 43. A pair of pins 62 carried by the head of the valve 56 provide means to limit the movement of the valve 56 and also of the valve 43.

With the valve 43 in the position illustrated, an annular recess 63 forms a fluid connection between a conduit 64 communicating with the bore 58 and a bore 65 formed in the casing structure 20 which communicates with a reservoir 66 formed in said structure. By provision of this passage, it will be understood that as the vane 52 moves in a clockwise direction, as indicated by the arrow, fluid discharged through the conduit 33 passes the open valve 56 into the bore 58 and through the conduit 59 to the intake side of the pump casing 39. If, however, due to leakage there is a suction produced in this portion of the system, additional liquid is drawn in from the reservoir 66 in which liquid is maintained at a sufficiently high level to fulfill operating requirements of the device. If, on the other hand, pressure has been developed in the system due to expansion by heating, the excess liquid is removed from this side of the circuit whenever the recess 63 is in registration with the bore 65. By this means the system is automatically retained filled and any excess pressure is automatically released upon each actuation of the device.

At the other end of the piston valve 43, an annular recess 67 is provided which is adapted to simultaneously register with a conduit 68 and a bore 69 when the operation of the device is reversed and pressure is applied to the right-hand end of a piston valve 43. It will be understood that up to this point the device is symmetrical and that the vane 52 may be operated in opposite directions by rotation of the steering wheel in opposite directions.

Whenever the operator stops applying force to the steering wheel 21, the valves 45 and 56 both seat as there is not pressure acting to move the piston valve 43 in either direction. Said valve then takes the dotted line position shown in Fig. 3 with the valves both in position against their respective seats.

Insofar as the device has been described up to this point when the valves 45 and 56 are seated, the vane 52 is hydraulically locked and the device would be non-yielding or irreversible. Under some conditions this is desirable as it takes all shock away from the operator.

In order to provide for a variable amount or degree of yieldability or reversibility when desired, a bore 70 communicates with a valve chamber 71 and the bore 72 connecting with the bore 60 communicates with the chamber 71 by means of a valve orifice plate 73. A needle valve 74 threaded through the casing structure into the chamber 71 is constructed to adjustably close the orifice in the valve plate 73, thereby regulating the discharge of fluid from the chamber 48 to the bore 60 and therefrom through the conduit 40 to the pump chamber. If a load is imposed on the vane 52 in an anti-clockwise direction when the valves 45 and 56 are closed, pressure in the vane chamber will be relieved at a rate determined by the setting of the valve 74. This escaped fluid will pass to the pump chamber and rotate the steering wheel in clockwise direction as the gear pump is reversible when fluid is applied by force thereto. It will be understood that the construction at the right side of the diagram in Fig. 3 is identical and serves the same purpose. A bore 75 communicates with a valve chamber 76, a bore 77 communicating with the bore 58 communicates through an orifice plate 78 with the chamber 76. The valve 79 adjustably threaded through the casing provides means for adjusting possible flow of liquid through the orifice plate 78.

It will be understood that when complete non-yielding or free reversibility of the vane 52 may be desirable, the valves 74 and 79 are completely closed. In this position of adjustment it is desirable to have a relief in case the steerable wheels engage an obstruction which would deliver a force capable of breaking or damaging the steering mechanism. In order to obtain this relief hydraulically, a conduit 80 connected to the chamber 48 is connected with a valve chamber 81 which is in turn connected by a conduit 82 to chamber 53. A check valve 83 held in position by a compression spring 84 permits flow under pressure sufficient to overcome the spring from the conduit 82 to the conduit 80. This spring is predetermined so as to act as a safety valve to protect the structural steering mechanism. A conduit 85 joining the conduit 80 connects with a valve chamber 96 which is also joined by a conduit 87 connected with the conduit 82. A ball valve 88 is engaged on its seat by a spring 89 to permit flow of liquid under pressure sufficiently to overcome the spring 89 from the conduit 95 to the conduit 87. By means of these two check valves 83 and 88 an excess torque in either direction on the shaft 35 is relieved by by-passing fluid from one side of the vane to the other.

There may be instances where heat develops excess pressure in the system by expanding fluid therein. To provide for this contingency a bore 90 communicates between the reservoir 66 and the chamber 48. A valve 91 is seated against the outlet of this bore into the reservoir, being held in seated position by a compression spring 92. The force of said spring is such that whenever excessive pressure is developed in the system, liquid escapes therefrom back into the reservoir. Only one of the valves 91 is required as excess pressure on the other side of the system by-passes the check valve 83 and therefrom by-passes the valve 91 into the reservoir.

The operation of the hydraulic steering mechanism disclosed herein has been explained in connection with the description of the component parts. It will be understood that applicant has provided a hydraulically operated steering mechanism in which provision has been made to change from a yielding to a non-yielding mechanism, also that provision has been made to take care of leakage and of the excessive pressures which might be built up in the closed circuits.

Although only one preferred embodiment has been illustrated, it is to be understood that applicant claims as his invention all modifications falling within the scope of the appended claims.

What I claim is:

1. A hydraulic steering system for vehicles including a hydraulic pump, two pump conduits connected to said pump, a hydraulic motor operable in two directions to steer wheels in either of two directions, a combined reservoir and valve casing, two motor conduits connected to said motor and to the valve casing, said pump conduits also being connected to the valve casing, said valve casing containing conduits between each pump conduit and a corresponding motor conduit, resiliently seated check valves for closing said communicating conduits, said valves being so arranged that fluid pressure from the motor through the motor conduits is operable to urge the valves into a seated position and so that pressure through the pump conduits is operable to open said valves for the flow of fluid therethrough, a fluid conducting passage between each pump conduit and the reservoir, valve means to close said passages, resilient means for operating said valve means to close said passages, pressure operated means communicating with each pump conduit to open said passages, means operable to open the check valve on one side of the system when fluid pressure is applied to the pump conduit at the other side of the system, by-pass conduit means around each of said valves for obtaining automatic yieldability and reversibility of the steering motor, and manual means for adjusting the flow through said by-pass means to adjust the rate of yieldability.

2. A device as set forth in claim 1 in which conduit means are provided between the two sides of the hydraulic motor, said conduit means having parallel passages, and oppositely acting spring pressed valves in said passages to permit movement of the motor in either direction upon the application of a force thereto sufficient to develop a fluid pressure greater than the pressure necessary to unseat said valves.

3. A device as set forth in claim 1 in which pressure relief means operable upon a predetermined pressure is provided communicating with one of the motor conduits and the reservoir.

4. A hydraulic steering system for vehicles including a manually operable reversible hydraulic pump, two pump conduits connected to said pump, a hydraulic motor operable in two directions to steer wheels in either of two directions, a combined reservoir and valve casing, two motor conduits connected to said motor and to the valve casing, said pump conduits also being connected to the valve casing, said valve casing containing communicating conduits between each conduit and a corresponding motor conduit, resiliently seated check valves for closing said communicating conduits, said valves being so arranged that fluid pressure from the motor through the motor conduits is operable to urge the valves into seated position and so that pressure through the pump conduits is operable to open said valves for the flow of fluid therethrough, a fluid conducting passage between each pump conduit and the reservoir, valve means for controlling each passage, resilient means for operating said valve means to close said passages, pressure operated means communicating with each pump conduit to open, respectively, a different one of said passages, means to open the check valves, and restricted by-pass conduit means around each of said valves for obtaining yieldability and reversibility of the steering motor.

5. A hydraulic steering system for vehicles with steerable wheels including a pump as the source of fluid under pressure, two supply conduits connected to said pump, said pump being reversible to supply fluid under pressure to either of said conduits and to drain fluid simultaneously from the other, a hydraulic motor operable in two directions to steer the vehicle wheels in either of two directions, a combined reservoir and valve casing, two motor conduits connected to said motor and to the valve casing, said pump conduits also being connected to the valve casing, said valve casing containing communicating conduits between each pump conduit and a corresponding motor conduit, resiliently seated check valves for closing said communicating conduits, said valves being so arranged that fluid pressure from the motor through the motor conduits is operable to urged the valves into a seated position so that pressure through the pump conduits is operable to open said valves for the flow of fluid therethrough, a fluid conducting passage between each pump conduit and the reservoir, valve means for controlling each pasasge, resilient means for operating said valve means to close said passages, pressure operated means communicating with each pump conduit to open said valve means for liquid flow through the passages, means operable to open the check valve at one side of the system when pressure is applied at the other side of the system, by-pass conduit means around each of said valves for obtaining yieldability of the steering motor, and means to adjust the rate of yieldability.

References Cited in the file of this patent

UNITED STATES PATENTS

| | | |
|---|---|---|
| 2,020,951 | Lemon | Nov. 12, 1935 |
| 2,236,467 | Clench | Mar. 25, 1941 |
| 2,288,076 | Erling | June 30, 1942 |
| 2,410,978 | Kelly | Nov. 12, 1946 |
| 2,451,689 | Nelson | Oct. 19, 1948 |